United States Patent [19]

Yoshimura et al.

[11] Patent Number: 4,679,124
[45] Date of Patent: Jul. 7, 1987

[54] SOLID ELECTROLYTIC CAPACITORS

[75] Inventors: Susumu Yoshimura; Yasuo Kudoh, both of Yokohama; Soji Tsuchiya, Kanagawa; Toshikuni Kojima; Shohzoh Takahashi, both of Kawasaki, all of Japan

[73] Assignee: Matsushita Electric Industrial Co., Ltd., Japan

[21] Appl. No.: 818,592

[22] Filed: Jan. 13, 1986

[30] Foreign Application Priority Data

Jan. 14, 1985 [JP] Japan .................................. 60-4288
Jan. 14, 1985 [JP] Japan .................................. 60-4289
Jan. 14, 1985 [JP] Japan .................................. 60-4290

[51] Int. Cl.4 .......................................... H01G 9/05
[52] U.S. Cl. .................................. 361/433; 252/62.2
[58] Field of Search ............... 252/62.2, 567; 361/314, 361/315, 433

[56] References Cited

U.S. PATENT DOCUMENTS 3,679,944  7/1972  Yoshimura et al. ................ 361/433
3,872,358  3/1975  Murakami et al. ................. 361/433
4,580,855  4/1986  Niwa .................................... 361/433

FOREIGN PATENT DOCUMENTS 3214355  12/1982  Fed. Rep. of Germany .
2113916   8/1983  United Kingdom .

OTHER PUBLICATIONS

J. H. Lupinski et al, "Electroconductive Polymers", Science, vol. 146, p. 1038 (1964).

Primary Examiner—Donald A. Griffin
Attorney, Agent, or Firm—Lowe, Price, LeBlanc, Becker & Shur

[57] ABSTRACT

A solid electrolytic capacitor comprising an anodized valve metal anode and a cathode provided in face-to-face relation with the anode, between which a layer of a solid electrolyte is provided. The solid electrolyte consists essentially of a tetracyanoquinodimethane complex salt and neutral tetracyanoquinodimethane. In order to suppress generation of toxic gases such as HCN, polyhydric alcohols may be further added to the solid electrolyte.

11 Claims, 8 Drawing Figures

SOLID ELECTROLYTIC CAPACITORS

BACKGROUND OF THE INVENTION

1. Field of the Invention

This invention relates to solid electrolytic capacitors which have much improved frequency and temperature characteristics and a prolonged life.

2. Description of the Prior Art

A recent trend toward the digitalization of electronic apparatus requires capacitors which have a reduced impedance in a high frequency range. As is known in the art, electrolytic capacitors have been used in various electronic apparatus as bypass capacitors because of the small size and the large capacitance. These electrolytic capacitors are also required to have an improved high frequency impedance at low temperatures, stability at high temperatures and life stability over a long term owing to the great development of recent electronic apparatus. Several types of capacitors are now used for applications in high frequency ranges, including plastic film capacitors, mica capacitors, layer-built ceramic capacitors and the like. However, the film and mica capacitors are so large in size that it is difficult to have a large capacitance. The layer-built ceramic capacitors have a very poor temperature characteristic when fabricated to have a large capacitance, and are expensive. On the other hand, aluminum dry electrolytic capacitors or tantalum solid electrolytic capacitors are enabled to have a large capacitance using a very thin anodized dielectric film. However, the dielectric film is apt to damage, so that it is necessary to often repair the damage by providing an electrolytic layer between the anodized film and a cathode. For instance, with aluminum electrolytic capacitors, an anode and a cathode whose surface area is increased by etching are convolutely wound through separators to give a unit. This unit is dipped in a liquid electrolyte to obtain a capacitor element. This involves several drawbacks such as an increase of impedance at high frequency or low temperature caused by the ion conductivity of the electrolyte, and a decrease of electrostatic capacitance or an increase of dielectric loss with time as a result of the leakage of the electrolyte. These drawbacks place a limit on use as the industrial capacitor. In this sense, an aluminum or tantalum solid electrolyte capacitor may be a kind of small-size and large-capacitance capacitor which overcomes the drawbacks of the above-described aluminum liquid electrolytic capacitor, but this has several drawbacks. In the fabrication of the solid electrolytic capacitor, an anode is immersed in an aqueous solution of manganese nitrate, followed by thermal decomposition in a high temperature furnace at approximately 350° C. to form a solid electrolyte layer consisting of manganese dioxide. The solid electrolyte layer exhibits much better frequency, temperature and life characteristics than liquid electrolytes. However, because the anodized film is inevitably damaged during several cycles of the thermal decomposition at high temperatures and manganese dioxide has a high specific resistance and behaves as a semiconductor with regard to electric conductivity, the impedance or dielectric loss in a high frequency or low temperature range is much higher than in the case of the film capacitor.

In order to avoid these drawbacks of the known capacitors, there has been proposed the use of organic solid semiconductors which have high conductivity and good anodizability. Especially, organic semiconductors consisting of tetracyanoquinodimethane (hereinafter abbreviated as TCNQ) complex salts have a number of advantages when used as the solid electrolyte for these purposes. For instance, the TCNQ complex salts may be applied to an anodized film by immersion in a solution of the salt in an organic solvent or in a melt of the salt by application of heat. This will mitigate the damage of the anodized film as will be caused by the thermal decomposition in the formation of manganese dioxide as described above. Moreover, the use of the TCNQ salt having electric conductivity similar to metals enables one to make capacitors of large capacitance having good high frequency characteristics.

The TCNQ salts suitable for these purposes are described, for example, in U.S. Pat. No. 3,872,358, Great Britain Pat. No. 2113916A and DE-OS No. 3214355. In these publications, there are used complex salts which comprise a cation of quinoline, isoquinoline or pyridine whose N position is substituted with an alkyl group and two TCNQ molecules. These salts have clear melting points when the alkyl group has 3 or more carbon atoms. Accordingly, they may be impregnated in a capacitor unit after melting, thereby forming a uniform solid electrolyte layer on the anodized film. The solid electrolyte-impregnated unit is used after covering with polymeric sealing materials by dipping, casting or potting in order to impart good resistances to humidity, heat and impact to the unit. The sealing materials are thermosetting resins including epoxy resins.

However, when the TCNQ-base solid electrolytes are used singly, several drawbacks are produced. For example, with a solid electrolytic capacitor obtained by impregnation with melt of a TCNQ salt, the composition of the TCNQ salt tends to be changed on melting, thus causing the inherent characteristics of the TCNQ salt to deteriorate.

The complex salt of TCNQ has a molar ratio of a cation and TCNQ of approximately 1:2. This ratio may vary by application of heat, so that the high conductivity of the TCNQ salt lowers. This is because one molecule of the two TCNQ molecules in the TCNQ salt is similar to neutral TCNQ in nature and is thus bonded only weakly in the semiconductor salt, so that when the salt is heated to a temperature of approximately 100° C. or over, the molecule tends to split off from the salt. In order to prevent the splitting of the TCNQ molecules, it is necessary to rapidly heat and melt the salt and to quickly quench the melt after application. However, this manner of application is not sufficient for the prevention. The problems involved in the splitting of the TCNQ molecules is as follows: the conductivity of TCNQ salt lowers to about 1/10 the original conductivity; and the anodizability lowers with a lowering of storage stability. The resulting solid electrolytic capacitor has thus a vital disadvantage of increasing an impedance and leakage current.

Other problems of the known TCNQ salt electrolytic capacitors reside in generation of toxic gases as a result of the thermal decomposition of TCNQ salts. If TCNQ salts are incidentally exposed to high temperatures such as by fire or by generation of heat through passage of overcurrent, the nitrile groups (—CN) in TCNQ are separated, with the possibility of emitting toxic gases or vapors such as hydrogen cyanide, acetonitrile and the like.

In the above prior capacitors, a TCNQ salt is impregnated in an anodized film or surface after melting of the salt. More specifically, after melting of the salt, an anodized film is immediately immersed in the melt and the immersion is completed within a short time before the thermal decomposition of the TCNQ salt takes place. Thereafter, the immersed film is quickly cooled to form fine crystals of the salt on and in the film. However, the melt of the TCNQ salt has generally a high viscosity and thus the immersion within such a short time as mentioned above is insufficient for impregnation in the anodized film.

SUMMARY OF THE INVENTION

It is therefore an object of the present invention to provide a solid electrolytic capacitor which overcomes the drawbacks of the prior art capacitors.

It is another object of the invention to provide a solid electrolytic capacitor which has a large capacitance and improved frequency characteristics.

It is a further object of the invention to provide a solid electrolytic capacitor which is suppressed from generating toxic gases on excessive heating.

The solid electrolytic capacitor of the invention is characterized by the presence of a specific type of solid electrolyte between a valve metal electrode anodized on the surfaces thereof and a counter electrode serving as a cathode. The solid electrolyte consists essentially of a TCNQ complex salt and neutral TCNQ. The TCNQ complex salt consists of one molecule of quinoline or isoquinoline whose N position is substituted with an alkyl group having from 3 to 6 carbon atoms such as propyl, iso-propyl, butyl, tert-butyl, pentyl, hexyl, etc. and two molecules of TCNQ. In addition, bipyridine may also be used instead of quinoline or isoquinoline. Preferably, polyhydric alcohols are added to the solid electrolyte for the reason described hereinafter.

DETAILED DESCRIPTION AND EMBODIMENTS OF THE INVENTION

The solid electrolyte used in the solid electrolytic capacitor according to the invention is a mixture of a TCNQ complex salt and neutral TCNQ. As defined before, the TCNQ complex salt consists of one molecule of quinoline or isoquinoline whose N position is substituted with an alkyl group having from 3 to 6 carbon atoms and two molecules of TCNQ. The solid electrolyte generally comprises from 5 to 100 parts by weight of neutral TCNQ per 100 parts by weight of the complex salt.

In our study, neutral TCNQ was added in order to make up TCNQ which sublimated from the complex salt on melting. However, it was unexpectedly found that neutral TCNQ had an additional marked effect on the TCNQ complex salt-base capacitor. More particularly, the amount of the sublimated TCNQ during the melting is at most 5 parts by weight per 100 parts by weight of the TCNQ salt. If so, an optimum amount of neutral TCNQ added to the TCNQ complex salt is assumed to be 5 parts by weight per 100 parts by weight of the TCNQ complex salt. However, it has been found that larger amounts of neutral TCNQ are very effective in improving the characteristic properties of the capacitor. This is considered as follows: since neutral TCNQ is electrically insulative, the resistance of the solid electrolyte to which not less than 5 parts by weight of neutral TCNQ is added increases with an increase of impedance of the resulting capacitor. This is contrary to our experimental results. The reason for this is not clearly known, but it is supposed from the fact that the manner of mixing prior to melting is important and a uniform melt is obtained, neutral TCNQ and a TCNQ complex salt form a kind of compound or even a novel compound on melting.

On the other hand, in order to effectively suppress generation of toxic gases as a result of thermal decomposition of the solid electrolyte, the solid electrolyte is preferred to contain not less than 2 parts by weight of a polyhydric alcohol per 100 parts by weight of the complex salt. Examples of the polyhydric alcohol include pentaerythritol, erythritol, sorbitol, mannitol and dulcitol, of which pentaerythritol is preferred. These may be used singly or in combination. Although the amount of a polyhydric alcohol has been defined above to be not less than 2 parts by weight, it may vary depending on the type of TCNQ salt. The lower limit should be an amount capable of effectively suppressing generation of hydrogen cyanide when the solid electrolyte is placed under temperature conditions of 250° C. or higher. The upper limit is about 40 parts by weight per 100 parts by weight of TCNQ complex salt because larger amounts give an adverse influence on the characteristics of the capacitor.

Figure 1:
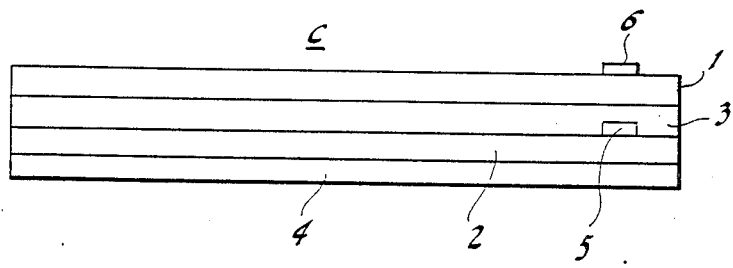
FIG. 1 is a developing view of a capacitor unit for illustrating a solid electrolytic capacitor according to the invention.
Figure 2:
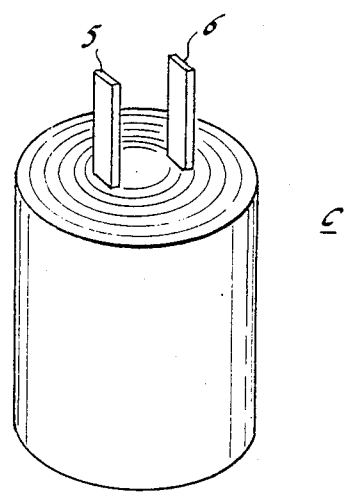
FIG. 2 is a schematic perspective view of a finished capacitor unit referred to in FIG. 1.
Figure 3:
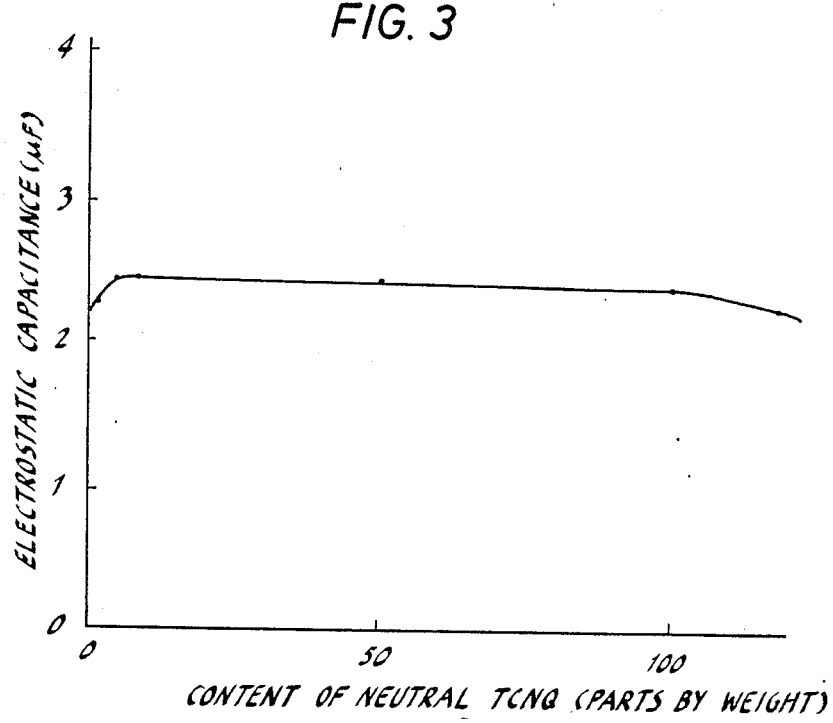
FIG. 3 is a graphical representation of an electrostatic capacitance of a solid electrolytic capacitor of the invention in relation to content of neutral TCNQ in a solid electrolyte used in the capacitor.
Figure 4:
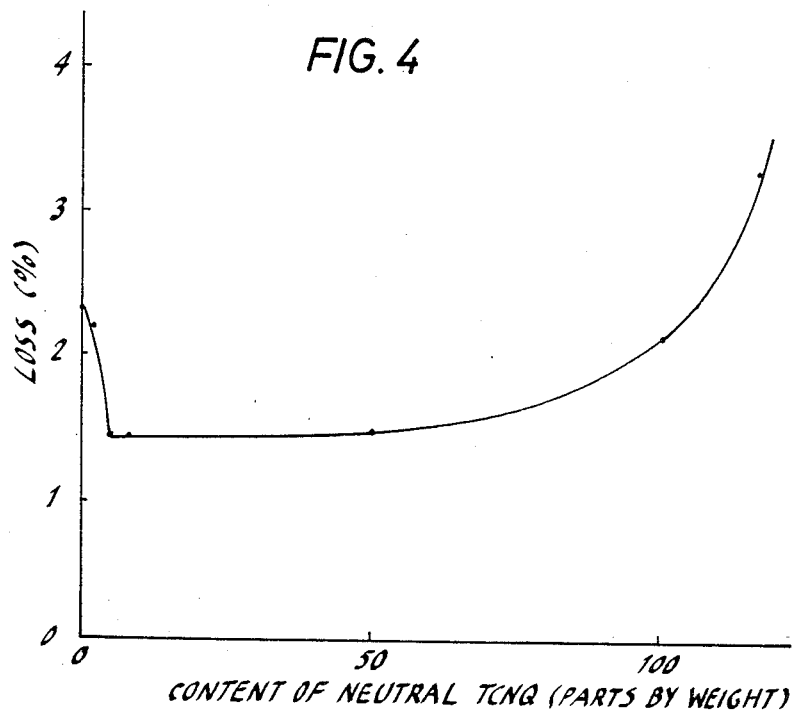
FIG. 4 is a graphical representation similar to FIG. 3 but tan d is shown.
Figure 5:
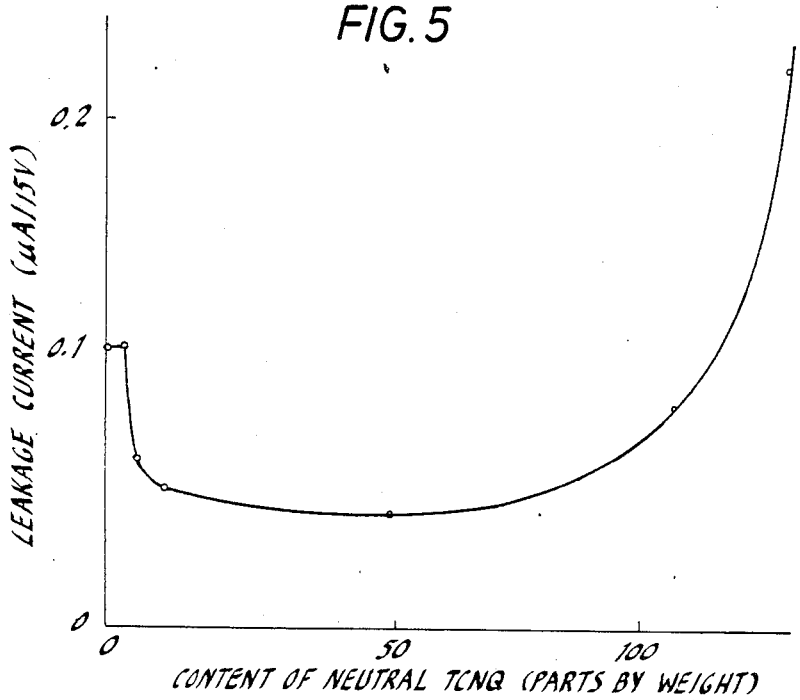
FIG. 5 is a graphical representation similar to FIG. 3 but leakage current is shown.
Figure 6:
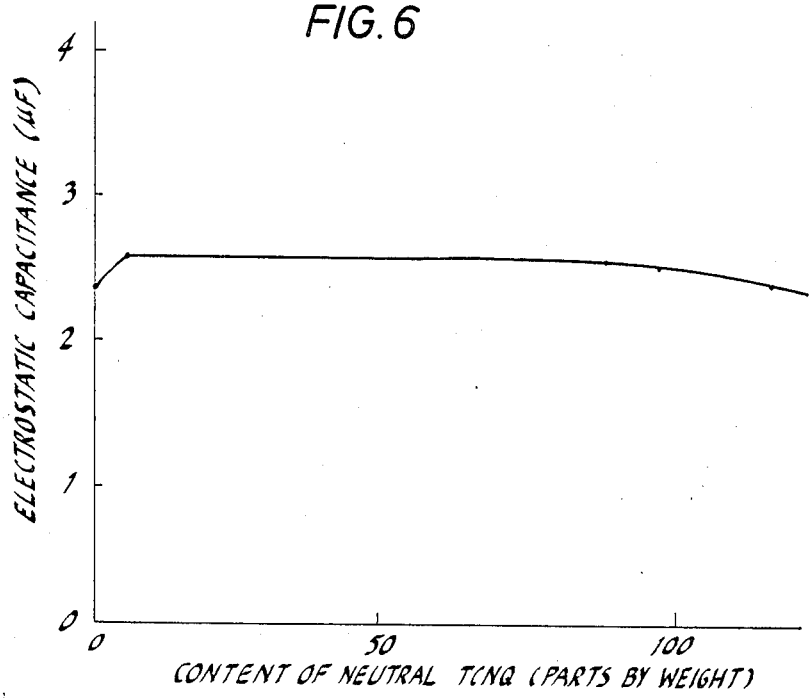
FIGS. 6 to 8 are, respectively, curves of an electrostatic capacitance, tan $\delta$ and leakage current of another type of solid electrolyte capacitor of the invention in relation to content of neutral TCNQ.
Figure 7:
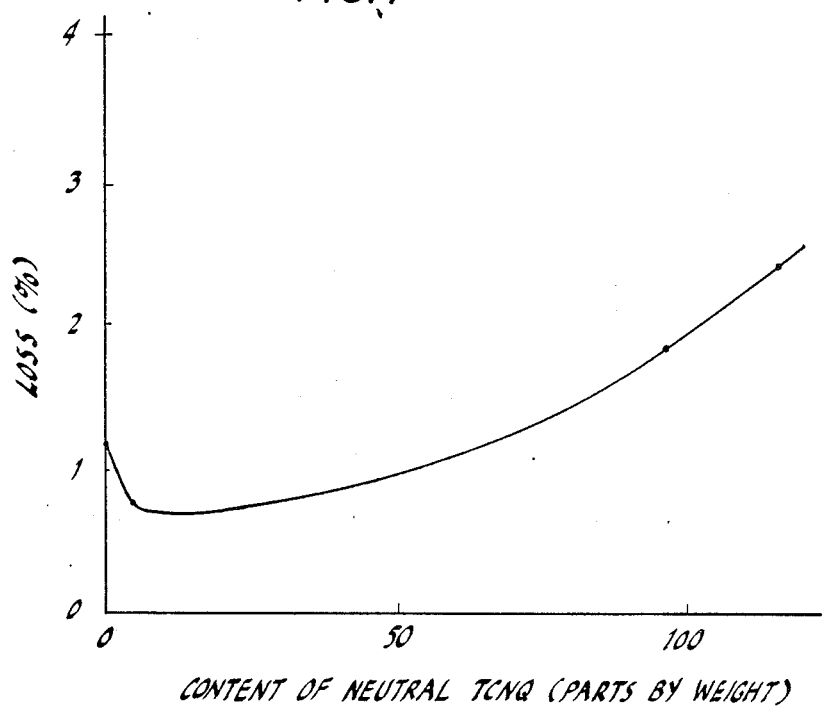
Figure 8:
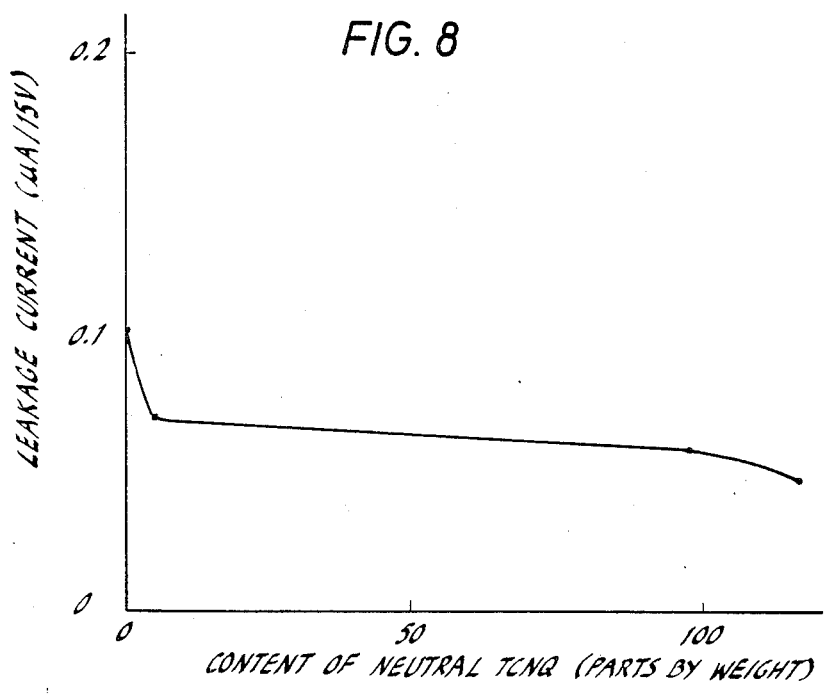

Reference is now made to the accompanying drawings and particularly to FIGS. 1 and 2. In the figures, there is shown, as developed, an embodiment of a capacitor unit C which includes an anode foil 1 anodized on both surfaces thereof and consisting of a valve metal such as Al, Ta or Ti and a cathode foil 2 consisting, for example, of Al. These foils have generally a thickness of 5 to 100 μm. The anode foil 1 and the cathode foil 2 are separated with separator sheets 3, 5. The separator sheet 4 is provided for separating the foils 1 and 2 on convolute winding. The anode foil 1 has an electrode lead 5 at one end. Similarly, the cathode foil 2 has an electrode lead 6. As a matter of course, the separator sheet 4 may be provided at the outer side of the anode foil 1. The separator sheets 3, 4 are generally made of 10 to 30 μm thick condenser paper. The developed unit of FIG. 1 is convolutely wound to give the capacitor unit C as shown in FIG. 2.

The capacitor unit C is immersed in a melt of neutral TCNQ, a TCNQ complex salt and, if desired, a polyhydric alcohol and rapidly cooled to form a solid electrolyte layer between the anode and cathode foils 1, 2. At the same time, the solid electrolyte is partially impregnated in the anodized surfaces of the anode foil 1. In the above embodiment, the convolutely wound capacitor is illustrated, but the solid electrolyte of the invention may be applied to any types or forms of capacitors using an anodized valve metal anode.

The impregnation is usually effected as follows: a mixture of neutral TCNQ and a TCNQ complex salt is melted at a temperature above 250° C. The capacitor unit as described above is immersed in the melt under a normal pressure for 10 to 180 seconds. Thereafter, the capacitor is withdrawn from the melt and rapidly cooled. As a result, the TCNQ salt is sufficiently impregnated in the finely etched, anodized surfaces.

In the practice of the invention, there is used a specific type of solid electrolyte which comprises a TCNQ salt and neutral TCNQ with or without a polyhydric alcohol. We have once considered that neutral TCNQ is insulative in nature and if it is added in excess, the resistance of a semiconductive TCNQ salt increases, giving an adverse influence on the characteristics of the resultant capacitor. However, this is not correct in view of our experimental results. Presumably, this is because when the TCNQ salt is melted, neutral TCNQ alone separates from the salt by sublimation. Accordingly, if neutral TCNQ is preliminarily added at least in an amount corresponding to the amount of the sublimation, the free TCNQ can chemically combine with the residue in the melt to form the salt.

The neutral TCNQ mixed with TCNQ salts has further advantages. Neutral TCNQ contributes to lower the viscosity of the melt of a TCNQ salt. Thus, the resulting melt has good fluidity and the applicability on the anodized surfaces with finely etched pits is much improved, leading to an improvement of initial capacitor characteristics.

The present invention is more particularly described by way of examples.

EXAMPLE 1

One hundred parts by weight of each of n-propylquinolinium (TCNQ)$_2$ and n-butylisoquinolinium (TCNQ)$_2$, which were, respectively, prepared by a known method, were mixed with from 2 to 120 parts by weight of neutral TCNQ. On the mixing, acetone was dropped into the mixture to give a paste, followed by uniform mixing over about 10 minutes whereby the acetone was evaporated and the mixture was dried. The above procedure was repeated three times to obtain a darker green powder. Each powder was dried in vacuum at 40° C. and further milled for use in the fabrication of a capacitor. About 60 mg of the powder were charged into an aluminum case and heated for melting up to 270° C. in about 10 seconds. A convoluted aluminum electrolytic capacitor unit as shown in FIG. 2 was immersed in the melt, and about 15 seconds after the immersion, the unit was abruptly cooled to room temperature. The capacitor unit used was subjected to chemical conversion at end faces of the aluminum unit and was preheated to 270° C. immediately before the immersion in the melt. The initial characteristics of the resulting solid electrolytic capacitors are shown in Table 1. These results are also plotted in FIGS. 3 through 8.

TABLE 1

| TCNQ Salt | Neutral TCNQ (parts by wt.) | Electrostatic Capacitance ($\mu$F) | Dielectric Loss (tan $\delta$) (%) | Leakage Current ($\mu$A/ 15V) |
| --- | --- | --- | --- | --- |
| n-propyl- | 0 | 2.23 | 2.35 | 0.10 |

TABLE 1-continued

| TCNQ Salt | Neutral TCNQ (parts by wt.) | Electrostatic Capacitance ($\mu$F) | Dielectric Loss (tan $\delta$) (%) | Leakage Current ($\mu$A/ 15V) |
| --- | --- | --- | --- | --- |
| quinolinium | 2 | 2.30 | 2.20 | 0.10 |
| (TCNQ)$_2$ | 5 | 2.50 | 1.45 | 0.06 |
| (100 parts | 10 | 2.52 | 1.45 | 0.05 |
| by weight | 50 | 2.49 | 1.50 | 0.04 |
| | 100 | 2.44 | 2.20 | 0.08 |
| | 120 | 2.30 | 3.42 | 0.20 |
| n-butyl- | 0 | 2.41 | 1.20 | 0.10 |
| isoquinolinium | 5 | 2.63 | 0.80 | 0.07 |
| (TCNQ)$_2$ | 100 | 2.55 | 1.90 | 0.06 |
| (100 parts by weight | 120 | 2.45 | 2.50 | 0.05 |

As will be apparent from the above Table and FIGS. 3 through 8, the dielectric loss (tan $\delta$) lowers considerably when the neutral TCNQ exceeds 5 parts by weight with a lowering of the leakage current. When neutral TCNQ is added in an amount of 120 parts by weight, the capacitance is almost equal to the case where neutral TCNQ is not added, but the loss and leakage current undesirably increase. In view of the above results, it will be seen that the amount of neutral TCNQ is in the range of from 5 to 100 parts by weight per 100 parts by weight of the TCNQ complex salts.

EXAMPLE 2 n-Pentylquinolinium (TCNQ)$_2$ was used as a TCNQ salt and was applied to a convoluted aluminum capacitor unit. Neutral TCNQ was added to the salt in different amounts in the same manner as in Example 1 except that methanol was used as a mixing solvent. The resulting powder was heated and melted, followed by immersion of a capacitor unit in the melt at a temperature of 280° C. and rapid quenching by the use of liquid nitrogen. The quenching was completed within about 5 seconds. When neutral TCNQ was not added, the electrostatic capacitance was found to be 52.6 $\mu$F and the loss was 9.5%. In contrast, when 10 parts by weight of neutral TCNQ was added, the capacitance increased up to 58 $\mu$F and the loss was reduced to 5%. In this case, when neutral TCNQ exceeded 100 parts by weight, the capacitance tended to abruptly decrease.

It was also found that the addition of neutral TCNQ resulted in a significant lowering of impedance at 1 MHz from 0.2 ohms to 0.09 ohms. The loss at $-55°$ C. lowered from 10% to 4.5%. Thus, neutral TCNQ showed a marked effect on the capacitor.

EXAMPLE 3

The general procedure of Example 1 was repeated except that 20 parts by weight of neutral TCNQ was added to 100 parts by weight of n-propylquinolinium (TCNQ)$_2$, thereby making a solid electrolytic capacitor. For comparison, the above procedure was repeated without use of neutral TCNQ. The capacitors were each subjected to measurement of characteristics at 85° C. immediately after the fabrication and after operation over 1000 hours. The results are shown in Table 2 below.

TABLE 2

| Amount of Neutral TCNQ | Initial Characteristics | | | After 1000 hours | | |
| --- | --- | --- | --- | --- | --- | --- |
| | Capacitance ($\mu$F) | Loss (%) | Leakage Current ($\mu$A) | Capacitance ($\mu$F) | Loss (%) | Leakage Current ($\mu$A) |
| nil | 32.5 | 8.4 | 0.09 | 30.5 | 12.3 | 0.09 |
| 20 parts by weight | 35.5 | 4.2 | 0.02 | 33.4 | 5 | 0.02 |

As will be seen from the above result, neutral TCNQ contributes to maintain good characteristics.

EXAMPLE 4

The general procedure of Example 1 was repeated except that 10 parts of pentaerythritol was added as a polyhydric alcohol and the powder charged into the aluminum case was heated for melting to 260° C. in about 10 seconds. The initial characteristics of the resultant capacitors are shown in Table 3 below.

TABLE 3

| TCNQ Salt | Neutral TCNQ (parts by wt.) | Electrostatic Capacitance ($\mu$F) | Dielectric Loss (tan $\delta$) (%) | Leakage Current ($\mu$A/15 V) |
| --- | --- | --- | --- | --- |
| n-propyl-quinolinium (TCNQ)$_2$ (100 parts by weight) | 0 | 2.00 | 3.40 | 0.06 |
| | 2 | 2.25 | 3.20 | 0.05 |
| | 5 | 2.45 | 1.90 | 0.01 |
| | 10 | 2.50 | 1.95 | 0.01 |
| | 50 | 2.49 | 1.83 | 0.02 |
| | 100 | 2.48 | 2.50 | 0.02 |
| | 120 | 2.30 | 3.80 | 0.09 |
| n-butyl-isoquinolinium (TCNQ)$_2$ (100 parts by weight) | 0 | 2.11 | 2.50 | 0.07 |
| | 5 | 2.55 | 1.00 | 0.07 |
| | 100 | 2.49 | 1.90 | 0.01 |
| | 120 | 2.25 | 2.60 | 0.05 |

In this example, a similar tendency as in Example 1 was recognized with respect to the initial characteristics.

The capacitors were each subjected to a test where an inverse current of 1 A was passed across the capacitor for 30 minutes and gases generated after the current passage were collected in a gas detector tube. As a result, it was found that hydrogen cyanide was generated in an amount of above 1000 ppm when pentaerythritol was not added, but was reduced to below 10 ppm on addition of pentaerythritol was added.

EXAMPLE 5

The general procedure of Example 2 was repeated except that dulcitol was added as a polyhydric alcohol with or without adding neutral TCNQ in different amounts and the immersion temperature was 270° C. The resulting capacitors were subjected to measurement of initial characteristics.

As a result, it was found that when 5 parts by weight of dulcitol was added per 100 parts by weight of the TCNQ salt without addition of neutral TCNQ. The electrostatic capacitance was 45.5 $\mu$F and the dielectric loss was 21.1%. In contrast, when 10 parts by weight of dulcitol was added, the capacitance increased to 55 $\mu$F and the loss decreased to 6.5%. When neutral TCNQ was added, similar results as in Example 2 were obtained, but the capacitance abruptly lowered when over 100 parts by weight of neutral TCNQ were added.

Moreover, the addition of neutral TCNQ was effective in lowering of an impedance at 1 MHz from 0.8 ohms to 0.2 ohms and also of a loss at $-55°$ C. from 25% to 7.0%.

In this example, hydrogen cyanide gas generated by thermal decomposition of TCNQ was scarcely observed when tested in the same manner as in Example 4.

EXAMPLE 6

The general procedure of Example 4 was repeated except that 2 parts by weight of mannitol and 20 parts by weight of neutral TCNQ were added to 100 parts by weight of n-propylquinolinium (TCNQ)$_2$, thereby making an aluminum solid electrolytic capacitor. For comparison, the above procedure was repeated without use of neutral TCNQ. The capacitors were each subjected to a life test at 85° C. The results are shown in Table 4 below.

TABLE 4

| Amount of Neutral TCNQ | Initial Characteristics | | | After 1000 hours | | |
| --- | --- | --- | --- | --- | --- | --- |
| | Capacitance ($\mu$F) | Loss (%) | Leakage Current ($\mu$A) | Capacitance ($\mu$F) | Loss (%) | Leakage Current ($\mu$A) |
| nil | 30.0 | 15.0 | 0.04 | 25.0 | 20.9 | 0.02 |
| 20 parts by weight | 34.5 | 6.4 | 0.03 | 32.0 | 7.2 | 0.02 |

Although the capacitance and dielectric loss characteristics of this example are slightly lower than those of Example 3 in which mannitol was not used, little hydrogen cyanide gas was found to be generated as tested in the same manner as in Example 4.

As will be seen from the above, when neutral TCNQ and polyhydric alcohols are added to TCNQ complex salts to provide solid electrolytes, the resulting solid electrolytic capacitors have a large capacitance and a low dielectric loss with an improved high frequency characteristic while suppressing generation of toxic gases.

From the foregoing examples, it will be seen that there are obtained, from electrolytes of TCNQ complex salts and neutral TCNQ, solid electrolytic capacitors which have a large electrostatic capacitance and a low dielectric loss with an improved high frequency characteristic. Neutral TCNQ can be added in a wide range of from 5 to 100 parts by weight per 100 parts by weight of TCNQ complex salt, resulting in a cost reduction. Especially, when the electrolyte of the invention is applied to a convolutely wound aluminum electrolytic capacitor, there are obtained high frequency capacitors of a small size and large capacitance which are better in performance and more inexpensive than built-layer ceramic or plastic film capacitors.

What is claimed is:

1. In a solid electrolytic capacitor which comprises a valve metal anode anodized on the surfaces thereof, a cathode arranged in face-to-face relation with said anode, and a layer of a solid electrolyte formed between said anode and said cathode, the improvement characterized in that said electrolyte consists essentially of a complex salt of 2 molecules of 7,7,8,8-tetracyanoquinodimethane and one molecule of a cation selected from the group consisting of quinoline and isoquinoline whose N position is substituted with an alkyl group having from 3 to 6 carbon atoms, and neutral 7,7,8,8-tetracyanoquinodimethane contained in an amount of from 5 to 100 parts by weight per 100 parts by weight of said complex salt.

2. A solid electrolytic capacitor according to claim 1, wherein said complex salt is N-substituted quinolinium (tetracyanoquinodimethane)$_2$.

3. A solid electrolytic capacitor according to claim 1, wherein said complex salt is N-substituted isoquinolinium (tetracyanoquinodimethane)$_2$.

4. A solid electrolytic capacitor according to claim 1, wherein said anode and said cathode are convolutely wound through separator sheets to prevent short-circuiting of said anode and said cathode.

5. A solid electrolytic capacitor according to claim 1, wherein said solid electrolyte further comprises a polyhydric alcohol.

6. A solid electrolytic capacitor according to claim 5, said polyhydric alcohol is a member selected from the group consisting of pentaerythritol, erythritol, sorbitol, mannitol and dulcitol.

7. A solid electrolytic capacitor according to claim 6, wherein said polyhydric alcohol is pentaerythritol.

8. A solid electrolytic capacitor according to claim 5, wherein said polyhydric alcohol is used in an amount of from 2 to 40 parts by weight per 100 parts by weight of the complex salt.

9. A solid electrolytic capacitor which comprises an anodized valve metal anode, a cathode arranged in face-to-face relation with said anode, and a layer of a solid electrolyte formed between said anode and said cathode, said electrolyte consisting essentially of a complex salt of two molecules of 7,7,8,8-tetracyanoquinodimethane and one molecule of bipyridine and neutral tetracyanoquinodimethane contained in an amount of from 5 to 100 parts by weight per 100 parts by weight of said complex salt.

10. A solid electrolytic capacitor according to claim 9, wherein said anode and said cathode are convolutely wound through separator sheets to prevent short-circuiting of said anode and said cathode.

11. A solid electrolytic capacitor according to claim 9, wherein said electrolyte layer further comprises a polyhydric alcohol in an amount of from 2 to 40 parts by weight per 100 parts by weight of said complex salt.

* * * * *